United States Patent [19]

Nemirofsky

[11] Patent Number: 5,767,896

[45] Date of Patent: Jun. 16, 1998

[54] TELEVISION SIGNAL ACTIVATED INTERACTIVE SMART CARD SYSTEM

[75] Inventor: Frank R. Nemirofsky, Danville, Calif.

[73] Assignee: Smart TV LLC, Burbank, Calif.

[21] Appl. No.: 524,087

[22] Filed: Sep. 7, 1995

Related U.S. Application Data

[62] Division of Ser. No. 183,525, Jan. 19, 1994, Pat. No. 5,594,493.

[51] Int. Cl.⁶ .................................................. H04N 7/08
[52] U.S. Cl. ........................... 348/13; 348/460; 348/473
[58] Field of Search ........................... 348/12, 13, 473, 348/475, 476, 477, 478, 479, 486, 460, 552; 235/375, 379, 380, 381, 383, 385, 376; 364/410–412, 400, 401, 402, 403, 406, 478, 479; H04N 7/00, 7/08, 7/087

[56] References Cited

U.S. PATENT DOCUMENTS

| | | | |
|---|---|---|---|
| 3,848,082 | 11/1974 | Summers | 348/473 |
| 3,959,624 | 5/1976 | Kaslow | 235/61.11 E |
| 4,029,506 | 6/1977 | Dessauer | 430/332 |
| 4,345,258 | 8/1982 | Tsai | 346/17 |
| 4,500,880 | 2/1985 | Gomersall | 340/825 |
| 4,540,880 | 9/1985 | Hipko | 235/487 |
| 4,564,853 | 1/1986 | Egan | 346/160 |
| 4,611,245 | 9/1986 | Trias | 358/235 |
| 4,613,904 | 9/1986 | Lurie | 348/473 |
| 4,620,877 | 11/1986 | Skukowski | 106/23 |
| 4,692,604 | 9/1987 | Billings | 235/493 |
| 4,723,212 | 2/1988 | Mindrum et al. | 364/401 |
| 4,751,509 | 6/1988 | Kubota | 340/784 |
| 4,802,080 | 1/1989 | Bossi | 363/75 |
| 4,807,031 | 2/1989 | Broughton et al. | 358/142 |
| 4,810,868 | 3/1989 | Drexler | 235/487 |
| 4,835,609 | 5/1989 | Uemura et al. | 348/473 |
| 4,874,935 | 10/1989 | Younger | 235/492 |
| 4,910,672 | 3/1990 | Off et al. | 364/405 |
| 4,916,296 | 4/1990 | Streck | 235/454 |
| 4,973,828 | 11/1990 | Naruse | 235/380 |
| 4,973,952 | 11/1990 | Malec et al. | 340/825.35 |
| 4,992,880 | 2/1991 | Trias | 358/236 |
| 5,008,519 | 4/1991 | Cunningham et al. | 235/383 |
| 5,055,662 | 10/1991 | Hasegawa | 235/492 |
| 5,073,931 | 12/1991 | Audebert et al. | |
| 5,120,941 | 6/1992 | Reilly | 235/575 |
| 5,153,842 | 10/1992 | Dlugos | 364/478 |
| 5,170,270 | 12/1992 | Yamamoto | 359/45 |
| 5,173,589 | 12/1992 | Diehl | 235/375 |
| 5,185,948 | 2/1993 | Markson | 40/506 |
| 5,194,722 | 3/1993 | Mergenthaler | 235/463 |
| 5,225,875 | 7/1993 | Shapiro | 340/703 |
| 5,227,874 | 7/1993 | Von Kohorn | 358/84 |
| 5,231,434 | 7/1993 | Kennedy | 353/122 |
| 5,233,654 | 8/1993 | Harvey et al. | 380/20 |
| 5,235,415 | 8/1993 | Bonicel et al. | 358/84 |
| 5,241,161 | 8/1993 | Zuta | 235/383 |
| 5,241,165 | 8/1993 | Drexler | 235/488 |
| 5,250,789 | 10/1993 | Johonsen | 235/383 |
| 5,252,815 | 10/1993 | Pernet | 235/441 |
| 5,287,181 | 2/1994 | Holman | 348/473 |
| 5,523,794 | 6/1996 | Markovitz et al. | 348/460 |

FOREIGN PATENT DOCUMENTS

0024820  10/1994  WIPO ........................... H04N 7/087

OTHER PUBLICATIONS

Summers, George D. "The Data-Dot™ System" Signal Jan. 1975 pp. 35-42

*Primary Examiner*—David E. Harvey
*Attorney, Agent, or Firm*—Irell & Manella LLP

[57] ABSTRACT

A smart card is disclosed which receives, decodes, and stores encoded data signals comprising redeemable coupons. Encoded data coupons are embedded within television segments and are transmitted along with the normal television segments. The smart card receives the luminescent signals which comprise the encoded data coupons directly from the display. The smart card decodes the data coupons. The coupon is then stored within the smart card for future use. The smart card is equipped with an LCD which enables UPC codes corresponding to each of the stored coupons to be utilized. A scanner reads the UPC codes at the coupon redemption site. Once redeemed, the coupon is erased from the memory in the smart card. Advantageously, all of the functions including receiving, decoding, and storing the data signals are performed by the smart card.

76 Claims, 7 Drawing Sheets

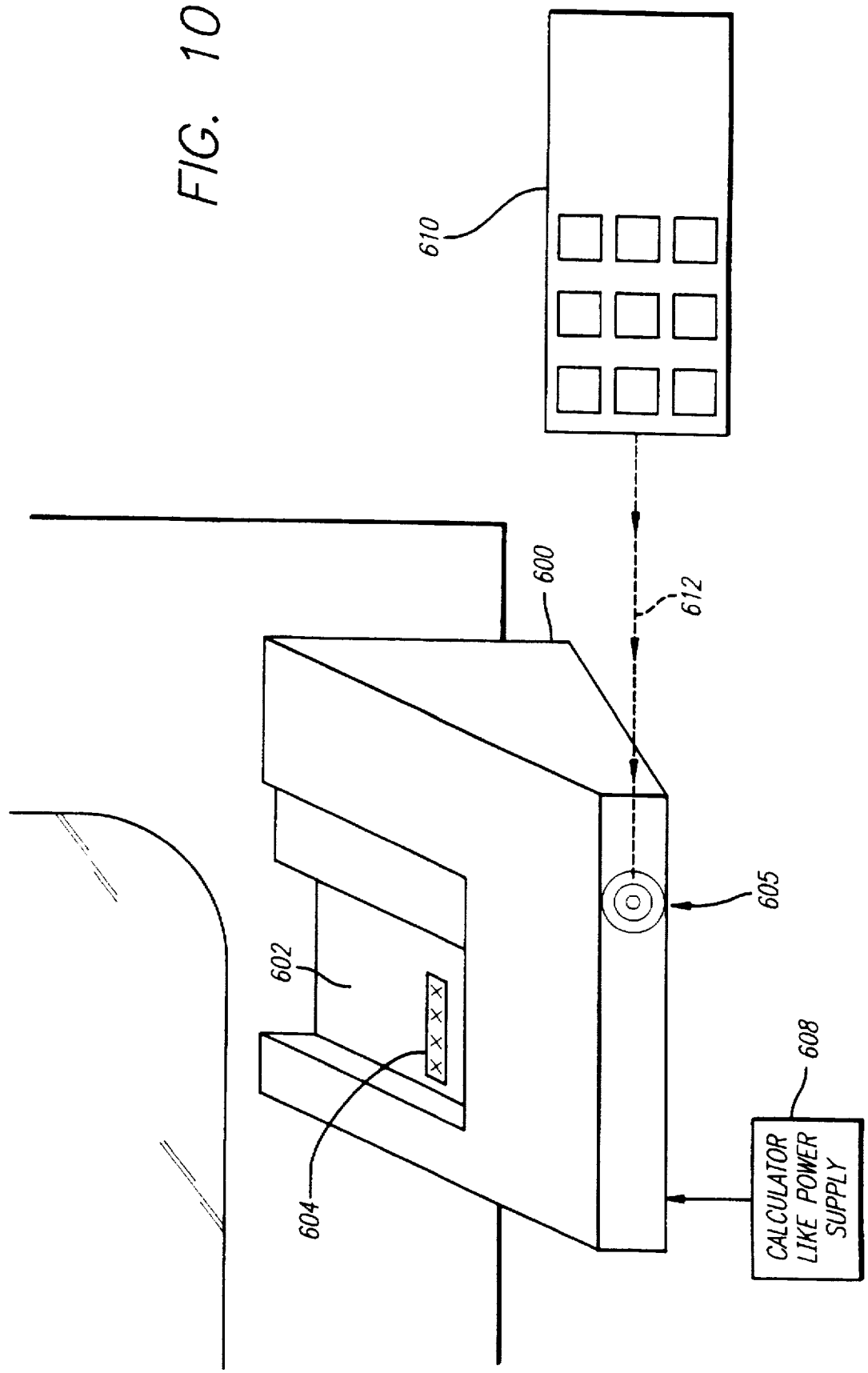

TELEVISION SIGNAL ACTIVATED INTERACTIVE SMART CARD SYSTEM

This is a division of application Ser. No. 08/183,525, filed Jan. 19, 1994 now U.S. Pat. No. 5,594,493.

FIELD OF THE INVENTION

The present invention relates to communication by television transmissions and more particularly to interactive communication between a television receiver and a smart card for purposes of delivery and use of benefit authorization, e.g. discounts on products to be purchased.

BACKGROUND OF THE INVENTION

The present invention provides for transmission of data information along with any standard television or computer video signal for reception by a "smart card" held near the television screen. This "smart card" can be embodied in a credit card, debit, affinity or identification card. The for the purpose of recording and storing the data information that can be presented at a point of purchase location, value redemption site, or benefit redemption venue, where the cardholder can redeem discounts, values, offers, or benefits by retrieving the data information from the smart card for example by a person and light scan readable display.

Traditionally, discounts and other such benefits, e.g. free samples and the like, have been provided or authorized by way of hard copy printing of coupons in newspapers, mailer brochures and the like. While such printed authorizations, e.g. coupons have been effective and extensively used, they have presented certain problems. Printed coupons require a substantial amount of time to prepare and deliver to the potential user. For example, one may need three months or more to print and deliver such printed coupons. The need for the promotion may change during that time. The present invention over comes such problems and permits almost instantaneous delivery of the benefit authorization and a very early use of the benefit authorization thereby better meeting the objectives of the company providing the benefit by data transmission of the authorization by commercial television. Such benefit authorization by data transmission using commercial television has not been known in the past.

Transmission of data together with television signals are known, including but not limited to, for example: Vertical Blanking Interval (VBI) data transmissions—typically Teletext and Closed captioning; FM broadcast radio subcarrier, and Cellular telephone-like data transmission systems. Such prior systems have been complex and not readily available to most television viewers.

Vertical Blanking Interval (VBI) has traditionally been a favorite place for placing data signals. Federal regulations allow virtually any information to be transmitted in VBI. While VBI may be used in carrying out the present invention, VBI data is concentrated in a small area of time within the video signal and is susceptible to many kinds of over-the-air transmission impairments. The effect on VBI system performance is a data rate dependent. Therefore as more data (higher rate) is squeezed into this small area the more likely errors are to occur. Impairments that destroy VBI, do not affect the data signal of the preferred embodiments of the present invention.

VBI requires a relatively complex decoder connected by wire or other means to the receiver of the television signal. The preferred embodiment of the present invention relies only on the light emanating from the TV set. The preferred embodiment of the present invention has the advantage that no wired connection to the video system is required and the signal survives transmission impairments.

Closed captioning is an example of a slow data rate VBI signal. Teletext is a higher data rate VBI signal. Picture waveform errors caused by distortions and ghosts result in the data being superimposed or added randomly with a delayed copy of itself, thus complicating clock and data recovery. This cross contamination is one cause of inter-symbol interference that can create a difficulty in detecting the difference between ones and zeros. The preferred embodiment of the present invention does not have problems of this nature.

VBI is also easily removed and routinely replaced along the signal transmission path by common processing amplifiers. The data signal of the preferred embodiment of the present invention is not easily lost, removed or affected because the signal of the present invention is dispersed in time with great redundancy.

The preferred embodiment of the present invention is free of interferences that are common to VBI systems, such as ghosts, non-linear distortions, group delay or K factor errors, AM transmitter errors like differential phase and gain, inter-modulation products, incidental phase modulation as well as noise sources such as ignitions, atmospheric interference, and arcing motors in home appliances. Since the transmission of data of the present invention utilizes a low data rate that is dispersed in time, the effects of such transmission problems are significantly minimized. The redundancy resulting from placing the same low level signal on virtually all the active video makes the data very tolerant of impairments. In fact, the television picture would have to become un-watchable before the data signal would be harmed. The signal has been successfully tested in the laboratory making off-air recordings on poorly maintained and miss-tracking home video cassette recorders.

FM Broadcast Radio Subcarrier and Cellular Telephone Like Data Transmission

Simulcast interactive systems can use auxiliary FM radio sub-carriers (FM-SCA) or cellular-phone-like data networks for the broadcast of the data to the home. Simulcasting requires close synchronizing to match interactivity with the program material. FM-SCA data systems suffer from the FM equivalents of the above errors, ghosts are called multi-path and fading (signal loss or nulls). Non-linear distortion, group delay and intermodulation are grouped with external interference or noise as interference. All of these conditions result in inter-symbol confusion. One advantage television has is that consumers understand that they need roof top antennas or cable TV to receive pictures. So TV roof top antennas or cable TV connections are the rule in suburban locations. While roof top FM antennas are the exception. Hence the odds are that distant TV signals will be better received than FM radio. That is one reason why many FM-SCA stations are needed to provide coverage for each TV station operating area.

Cellular-phone-like data systems have the above FM impairments and by their nature require that cell density matches user density. Present phone computer modems fail when used on cellular systems because the modems were designed for ordinary telephone line problems. The common computer modem cannot cope with cellular hand-offs, multi-path and fading. The present invention utilizes a signal with the data imbedded in the video signal; thus video and data signals are received simultaneously and with equal clarity.

Consumer Recording of Signal

Most homes have Video Cassette Recorders and many people use their VCR's to time shift programs for their convenience. VBI can be recorded only by a small number of the most sophisticated Video Tape Recorders. No consumer VCR's can record simulcast signals such as FM-SCA subcarrier and Cellular Telephone like signals. The present invention works well and can be recorded on even the simplest of consumer VCRs. Additionally, pre-recorded commercially available video tapes, video discs, CD ROM's, and any other media that contain material such as movies, information videos, software for home computers that can be shown via any scanned television like system, can also be encoded with offers, discounts, and benefits available to consumers using the present invention.

A common smart card is characterized as a card-like device with a microprocessor and memory. A typical use could be a debit card with the money value imbedded within the card system. As purchases are made, the amount is subtracted from the total available cash which corresponds with the amount of funds in an account in a financial institution. A smart card in the format of a credit card, allows for the credit limit to potentially be included in the data within the card. The amount is then modified to represent the currently available credit as the card is used to purchase items. The card may be periodically updated as funds are paid to the account. The updating may occur at the bank or at an automatic teller or other such terminal. In the interration as a medical information card, a smart card may accommodate a patient's history encoded within the card data for subsequent use.

The present invention uses a unique smart card featuring a smart chip (integrated circuit) that is imbedded in a credit, debit, affinity or identification card that captures and stores a televised signal that a person in turn can interpret. The card with the recorded signal provides a light-scan readable display allowing for benefits to be offered to the cardholder.

SUMMARY OF THE PRESENT INVENTION

The present invention utilizes in combination, any scanned television like system (such as a conventional television transmission path or computer video signal), a conventional television receiver or computer and monitor, a "smart card" imbedded with a photoelectric television signal optical pick-up device, and a human and light scan readable display at a benefit redemption venue.

The present invention provides a method of sending data transmission along with a standard television signal in the form of changing light pulses. This light modulation is then sensed by a photoelectric pickup device within the smart card where it is captured and stored. This stored data can be displayed and read by a terminal at a benefit redemption venue, among which can be mass merchandisers, supermarkets and department stores.

One example of the present invention's usage is in conjunction with television broadcast advertising for retail point of purchase discounts. The method includes the step of broadcasting an advertisement by television. The advertisement includes an imbedded light signal data code which contains product discount information.

The advertisement and the authorization data are simultaneously received by a television set. The authorization data is sensed and recorded on a smart card when the card is held with the photoelectric pick-up device near and facing the television. Confirmation of good data reception is delineated to the TV Cardholder via characters displayed on the TV Card. The smart card can then be taken to a point of purchase location where it can be read for the purpose of authorizing the advertised discount rate in the purchase of the identified product.

The present invention uses the TV Card to record sequences of light pulses from the television set. The recording may be of a form conforming to a bar code sequence. The sequence of light pulses originates from the in-home television receiver. The present TV Card may be adapted to record a plurality of sets of product identification/discount rate data items that are for use in product purchasing. The method of the present invention allows for selective processing of data items recorded within the present TV Card, for example, the selective editing or erasure of outdated discounts. The present method may include the use of a visually observable indicator or icon in the televised advertisement providing notice that the advertisement carries a non visual signal of product identification, discount rate or other value. Use of an identification/discount rate signal in the form of a bar code may be included. The method may include an automatic release or removal of the recorded data after the expiration of a specific time period, such as a week or a month. Alternatively, the data received through the television set may include removal date data which automatically removes the recorded data on a specified date. The method of automatically removing the data may provide that the specific time period is carried by authorization signal and imputed into the smart card along with the product identification/discount rate data.

The present method may include step wherein the television advertising is recorded on a video recording for reading by the smart card when the video is later played on a television set.

The present invention utilizes the TV Card to record the data transmission. The TV Card may be of credit card size and has embedded thereon an integrated circuit chip that is connected to a photoelectric light detector and further may include a changeable and addressable LCD or other type of bar code display. The present TV Card may have a permanent bar code and magnetic strip that is keyed to a data base and contains information about the card owner. The present card may further and simultaneously serve as a credit, debit, affinity, identification or other appropriate application.

The present invention requires no new equipment anywhere in the transmission line. Television Network Facilities, Telephone Company Facilities, Micro-wave Link Systems and Satellite Transmission / Receive systems required no changes. Television stations use their current video tape recorders, production plants and transmitter. Cable systems require no changes to accommodate the present invention. Retailers may use their existing bar code readers. However, the present invention allows for system enhancement as hereinafter described, via hardware and software options.

The information recorded on the present invention TV Card is erasable at any time. The present invention allows the advertisers to offer a plurality of values and make offers for use within specific and varied time periods.

The television data signal is unobtrusive. It is invisible except for the icon which "announces" that a value is available to TV Card holders. The present invention affords a nearly fail safe data transmission via standard computer and television transmission methods.

The present TV Card concepts are simple to understand by all involved groups: Advertisers, consumers, broadcasters, program originators and sellers or retailers. The present data signals can be transmitted from many separate locations. Each transmitting station can pre-record the commercials from satellite distribution or a network transmission feed. Because the data signal is embedded in the program material, the information is therefore always precisely synchronized and matched to the video.

The present invention uses a separate independent data channel for each television signal transmitted. When a data signal is encoded within programs and commercials at the production source, the data is always present on the correct channel, at the correct time. This is not the case with simulcast FM-SCA and cellular telephone-like systems which must synchronize data for many video channels with the single data channel. This requires the data channel to cope with the different cable channel line-ups, satellite and broadcast channel positions for each area in each market. Currently, more than 100 channels are available in all U.S. markets with many markets planning 500 to 1,000 different channels.

The present invention provides broadcasters with a new service to offer that enhances previously existing advertisements and programming. This is clearly an added value to the television broadcast and cable television industries.

Consumers are accustomed to watching television and also using credit cards while shopping. The combination of holding the present TV Card with a photoelectric television signal optical pick-up device near and facing the television receiver as a new interactive method of receiving value that will enhance the viewing, shopping, and value redemption experience. The viewer will now realize an added benefit to watch specific TV Card enhanced programming. The present invention utilizes a robust data signal in a standard video transmission system that has been tested and proven to function on cable television and broadcast stations using existing equipment. The present invention allows television broadcasters, cable television networks, advertisers and other program producers to improve their current services and to achieve and offer new sources of revenue.

When a television commercial is broadcast with a visual icon or audio indication that it is a TV Card encoded spot, the consumer points the card with its photoelectric television signal optical pick-up devise near and towards the television thereby activating the card. The encoded message is automatically received by the present TV Card and is stored in its memory. This information can then be read by any conventional retail check-out scanner when the consumer purchases an identified item. The offer or value that was stored in the TV Card is then credited to the consumer after the TV Card is read.

The information stored on the permanent bar code and magnetic strip allows the card to be used as a conventional credit or debit card and can also provide demographic, psychographic and other pertinent measurable information about the cardholder. The consumer must watch and engage the TV Card encoded programming to receive the value.

Use of the TV Card offers a new broad form of television induced measurement. The measurable purchasing or other pertinent data stored at the redemption venue or level offers almost instant information that can be used by broadcast television networks, cable television networks, advertisers, manufacturers, sellers and retailers and other interested parties. The measurable purchasing data stored at the redemption venue or level, can be transferred to a central data bank for compilation, interpretation, and storage.

To make the use of the TV Card easier, it is desirable to receive data from the light of the television receiver at a variety of distances. The size of the card limits the size of the optical pick-up device, requiring that the card be held close to the TV set to receive data. The addition of methods to extend the pick-up range are desirable. A card holder which has a recess in which the card is placed allows several desirable benefits: a larger battery source for power, room for larger light gathering optics, additional large operational buttons or controls and connection means to transfer information to and from the card. An alternative method to receive data from the television is to employ a holder at a stationary position near the TV set. This allows the card's optics to detect the light while a calculator style power module supplies power from the building's AC power line. Alternatively an additional set of optics and an optical pick-up device may be built within the holder to transfer data directly to the card via connection means. A remote control and sensor may also be provided for the customer to use in choosing which offer that they would like to participate and-record within the card. The holder can also provide space for additional controls buttons, lights as desired. For example, because the holder is not limited by size of a battery, a light may be lighted when a commercial or program segment containing TV Card data is present.

A purely mechanical stand or holder may orient the TV Card to provide a more efficient view of the television. The customer may press the "activate" button and place the TV Card upon the stand; or if the TV Card was already in the stand, press the "activate" button. One object of the present invention is to assure the client that a human is watching the programming containing the data. To accomplish this the card may be designed to require that the button be pressed to respond to each offer. Also, to conserve power, it is not desirable to leave the TV Card's optical pick-up active for long periods of time. The button to "activate" may be required to be pushed and released for every individual offer, thus preventing the consumer from mechanically holding the button down and leaving the room for a series of advertisements.

A consumer center specifically designed for the present invention may be provided in retail establishments to print coupons with high speed and quality printers. The paper can be closely controlled to reduce coupon counterfeiting. The preferred embodiment may be operated completely without any paper component.

The present invention uses technology that allows data to be transmitted along with standard broadcast video. The card uses a simple code imbedded in the picture that produces a slight, line-by-line brightness modulation. The result is a signal invisible to humans, but easily detected by the TV Card. Each TV Card may have a unique identity or serial number which identifies demographics, psychographics and other measurable information about the card owner. This information is imbedded in a magnetic strip and a bar code strip on the back of the card. These strips can either be scanned, or "swiped" allowing the consumer to use the card either as a credit, debit, affinity or identity card. As the card is scanned, the store computer can process data about the products purchased and who purchased them. The consumer information is accessible whether or not the consumer uses the card for payment. The stored product data within the card can be programmed to self erase in a specific time period or after a certain number of point of sale scans. The data integrity is preserved by using the commonly accepted computer data transmission and encryption technologies. Parity and Cyclic Redundancy Checks (CRC) insure that the data is properly received.

IN THE DRAWINGS

FIG. 10 shows an alternate embodiment employing a stationary smart card holder at a position near the TV set.

PREFERRED EMBODIMENT

Figure 1:
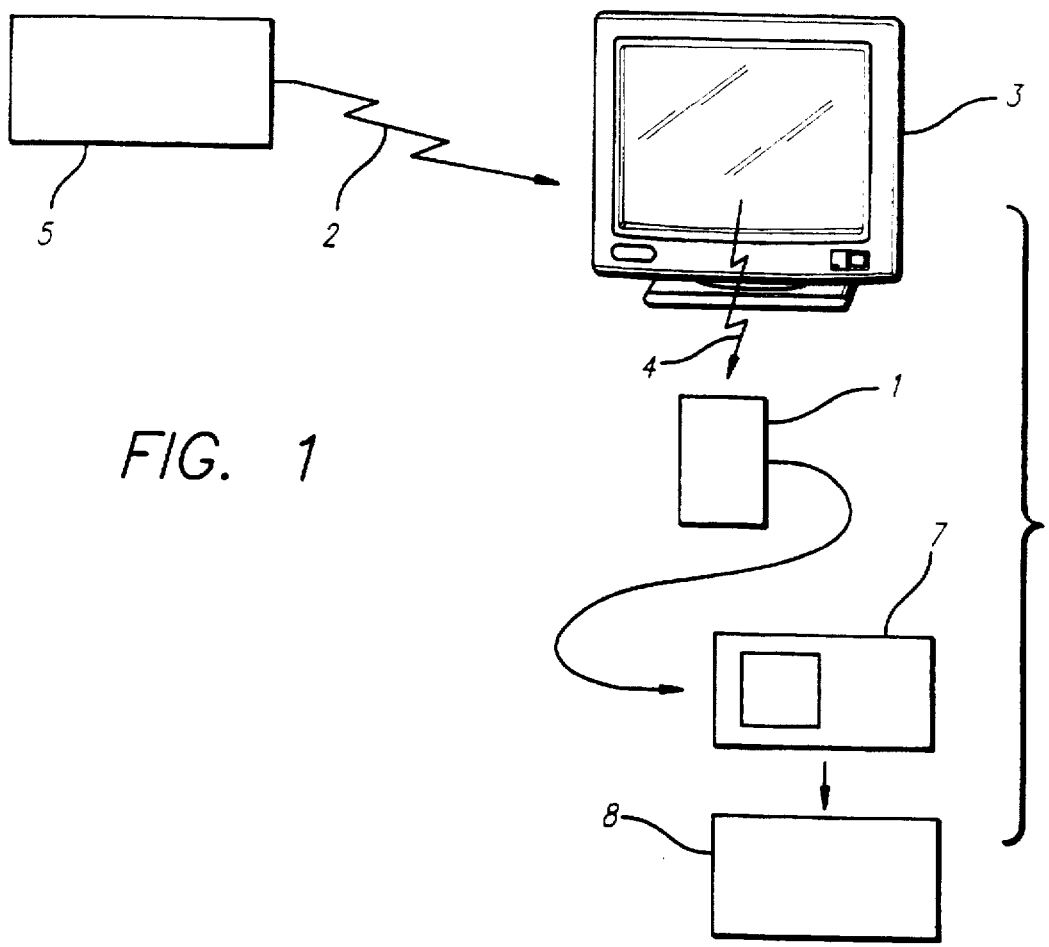
FIG. 1 is a block diagram illustrating the communication links in the present invention.

The present invention relates to a method for handling the authorization, delivery and use of redemptions, such as discount coupons. FIG. 1 in the drawings illustrates the various elements involved in the handling of the authorization, delivery and use of the redemptions. The present invention includes use of a TV card 1, which is in the form of a smart card adapted to read and record signals 2 from a scanned cathode ray tube such as a television receiver 3. The signal 2 may be transmitted to the television receiver as part of a conventional transmission from a television station 3. The television signal 2 may include an encoded signal of pulsing light 4 displayed by the television receiver 5. The pulsing light 4 is not apparent to the persons watching the television receiver; however, the pulsing light 4 is readily read by the TV card 1. The person using the TV card 1 preferably holds the TV card 1 up to the television receiver 3 while the signal 2 is being displayed. Once the benefit is recorded on the TV card 1, the person may take the TV card 1 to a point of purchase store 6 where the card 1 is read by the bar code reader 7. The method may include the use of data collection as a station 8 from the bar code reader 7 to record the use of the authorization and allocate payment to the point of purchase store for reimbursement and handling of the benefit.

Figure 2:
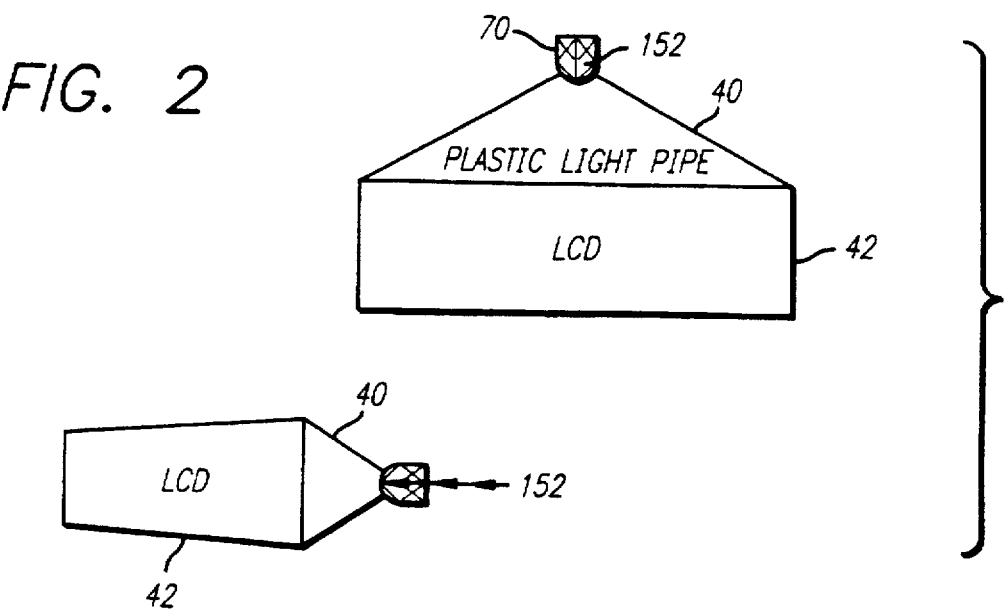
FIG. 2 is top view of the present TV card showing the bar code portion and the magnetic stripe portion.

In the present invention the TV Card 10 may resemble a credit card in size and dimensions. The TV Card 10 may be somewhat thicker to protect the Liquid Crystal Display from flexing and to contain a battery. With reference to FIG. 2, the front surface has an LCD 42 with both alpha-numeric and bar code display capabilities and several buttons to control various functions. The side view pin points the lens of the photo pick-up device 70 that detects light from the TV screen. Though the lens is drawn as protruding, it also may be flush or indented as desired. The rear surface contains a printed or engraved bar code label 200 representing the individual serial or account number associated with the present invention TV card.

When the TV Card is held over or near the point of sale laser or light scanner, it intercepts the laser or light beam. The action of scanning the display may cause the erasure of the specific item information if it were so programmed. To accomplish this, the display of the TV Card is fitted with an optical light collecting, concentrating mechanism. As shown in FIG. 2, among the methods shown but not limited to are, a light pipe or lens 40 optically bonded on one side the LCD 42 and one the other the photo pick-up device 152, the lens type may be coherent (imaging) or incoherent (non-imaging). The edge of the LDC is treated to increase the light transmitted to the LCD, the methods include all of a flat polished edge, brewster angle, corner reflectors or skewed or focusing reflections. The LCD technology allows many variations of configuration, such as an LCD in which the LCD material reflects light to produce a white on black display with a light adsorptive or defusing back surface. The front surface is circularly or otherwise polarizing or dichroic filter coated to increase the contrast ratio. An LCD with a polished front surface and retro-reflective back surface. The retro-reflective rear surface may consist of corner reflectors, parabolic pits or beads or prisms. Since the present card is held by a person during scanning the front surface reflection will not usually be directed back precisely to the source of light (nodal point) and the photo detector. However, the back surface light will always be directed precisely back to the nodal point.

An LCD in which the LCD material absorbs or defuses light to produce a black on white display, with a light reflecting or refracting back surface. The back surface may be a dichroic or other reflecting means. The front surface, if desired, may be limited to a dichroic or rough (at optical wave lengths) defusing or non-reflecting glare reduction means.

Figure 3:
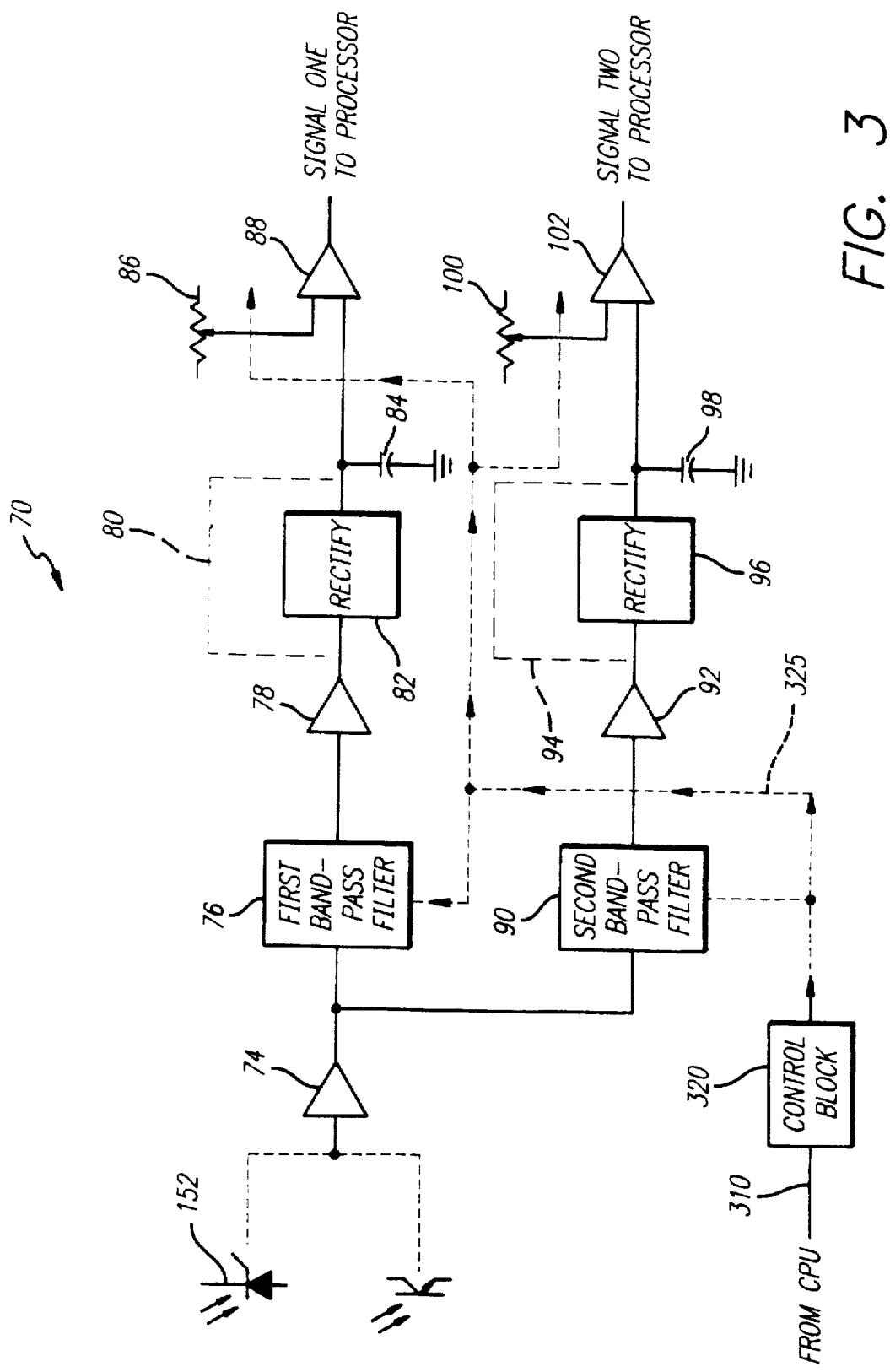
FIG. 3 is an illustration of the TV card of the present invention showing in broken lines the various elements of the card.

FIG. 3 illustrates that the light from the TV screen impinges upon the photo pick-up device 72 and is amplified by amplifier 74. Amplifier 74 may or may not contain automatic gain control (AGC). Band-pass filter 76 may consist of filtering means, such as resistor-capacitor, inductor-capacitor or ringing tank type frequency separation. The frequency selected may be used to indicate the primary cathode ray tube (CRT) or TV scanning frequencies utilized by-the particular video standard in use (i.e. PAL, NTSC, SECAM, HDTV, VGA, line or field doubling etc.) The signal of band-pass filter 76 is amplified by amplifier 78, envelope detected by envelop detector 80 via rectifier 82 and capacitor 84. Comparitor 88 has its threshold set by potentiometer 86. The signal is then passed to the micro-processor for further qualification as to timing and phase criteria. This signal is utilized to synchronize to the video timing of the light.

Band-pass filter 90 consists of filtering mechanism such as resistor-capacitor, inductor-capacitor or ringing tank type frequency separation. The frequency selected is used to separate the data displayed on CRT. The signal of band-pass filter 90 is amplified by amplifier 92, envelope detected by envelop detector 94 via rectifier 96 and capacitor 98. Comparitor 102 has its threshold set by potentiometer 100. That signal is then passed to the microprocessor for further qualification as to timing and phase criteria. This signal is utilized to detect the data encoded with-in the video signal light and is compared to the signal from comparitor 88. In each case, the comparitors are illustrated by simple comparitors, in practice they may contain more complex implementations such as: dual slope, hysteresis, multiple threshold and/or noise coring types.

Figure 4:
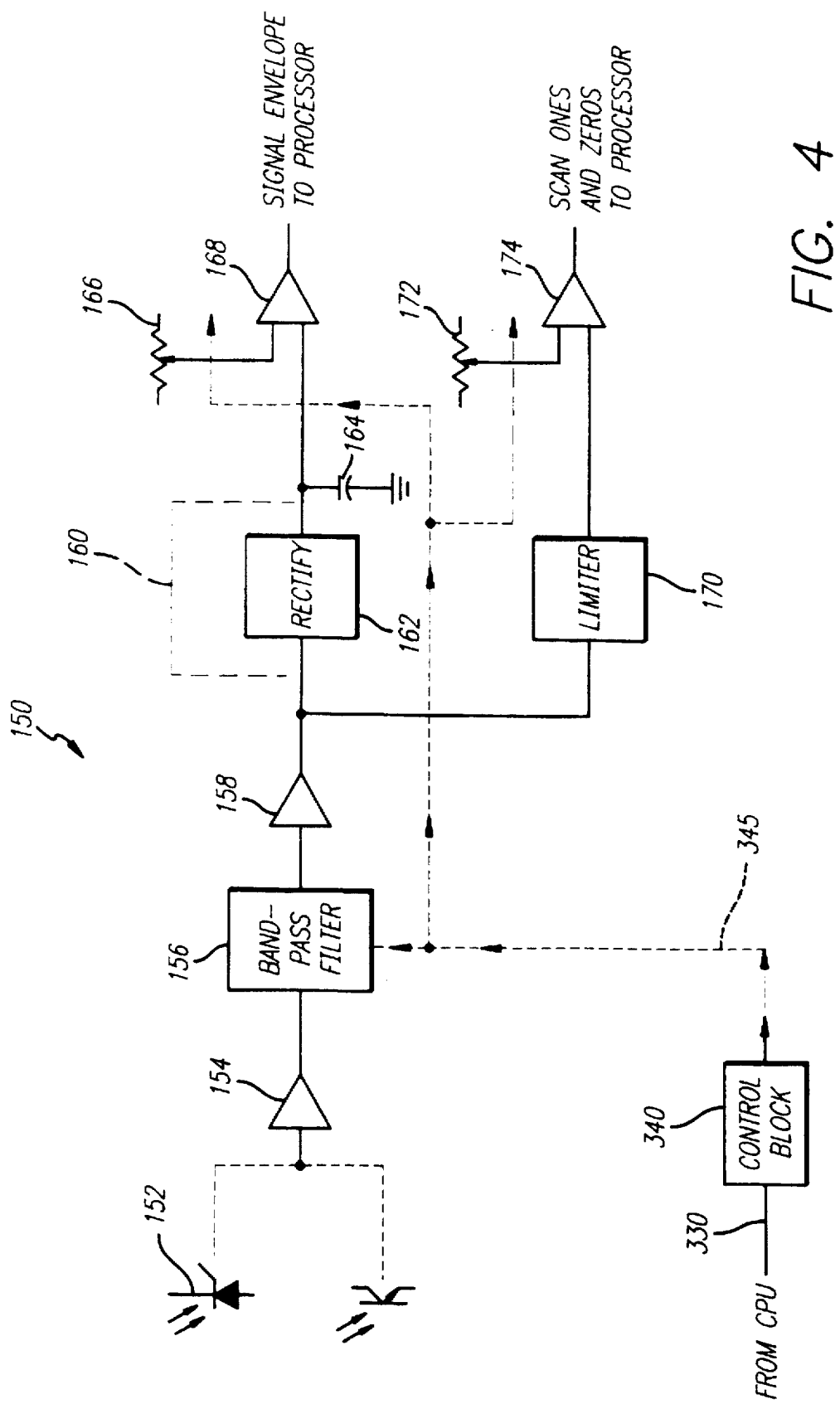
FIG. 4 is an end view of the present TV card.

Scan detector circuit 150 of FIG. 4 shows the light from the point of sale scanner impinges upon the photo pick-up device 152 which is optically coupled to the LCD and is amplified by amplifier 154. Amplifier 154, if desired, may contain automatic gain control (AGC). Band-pass filter 156 is complex and consists of filtering mechanism, such as, resistor-capacitor, inductor-capacitor or ringing tank type frequency separation. Band-pass filter 156 also accepts commands from the microprocessor to react to ambient lighting and other environmental variables, among the possible variables are; gain, (linear and non-linear) band-width and center frequency and time duration and repetition rates. The signal of band-pass filter 154 is amplified by amplifier 158, envelope detected by envelop detector 160 via rectifier 162 and capacitor 164. Comparitor 168 has its threshold set by potentiometer 166. The signal envelope is then passed to the microprocessor for further qualification as to timing and phase criteria.

The signal of amplifier 158, is limited by limiter 170. Comparitor 174 has its threshold set by potentiometer 172. The signal representing bar code ones and zeros is then passed to the microprocessor for further qualification as to timing and phase criteria. This signal is utilized to detect the data encoded with-in the point of sale scanning light.

While the comparitors are illustrated as simple comparitors, in practice they may contain more complex implementations such as: dual slope, hysteresis, multiple threshold and/or noise coring types.

Figure 5:
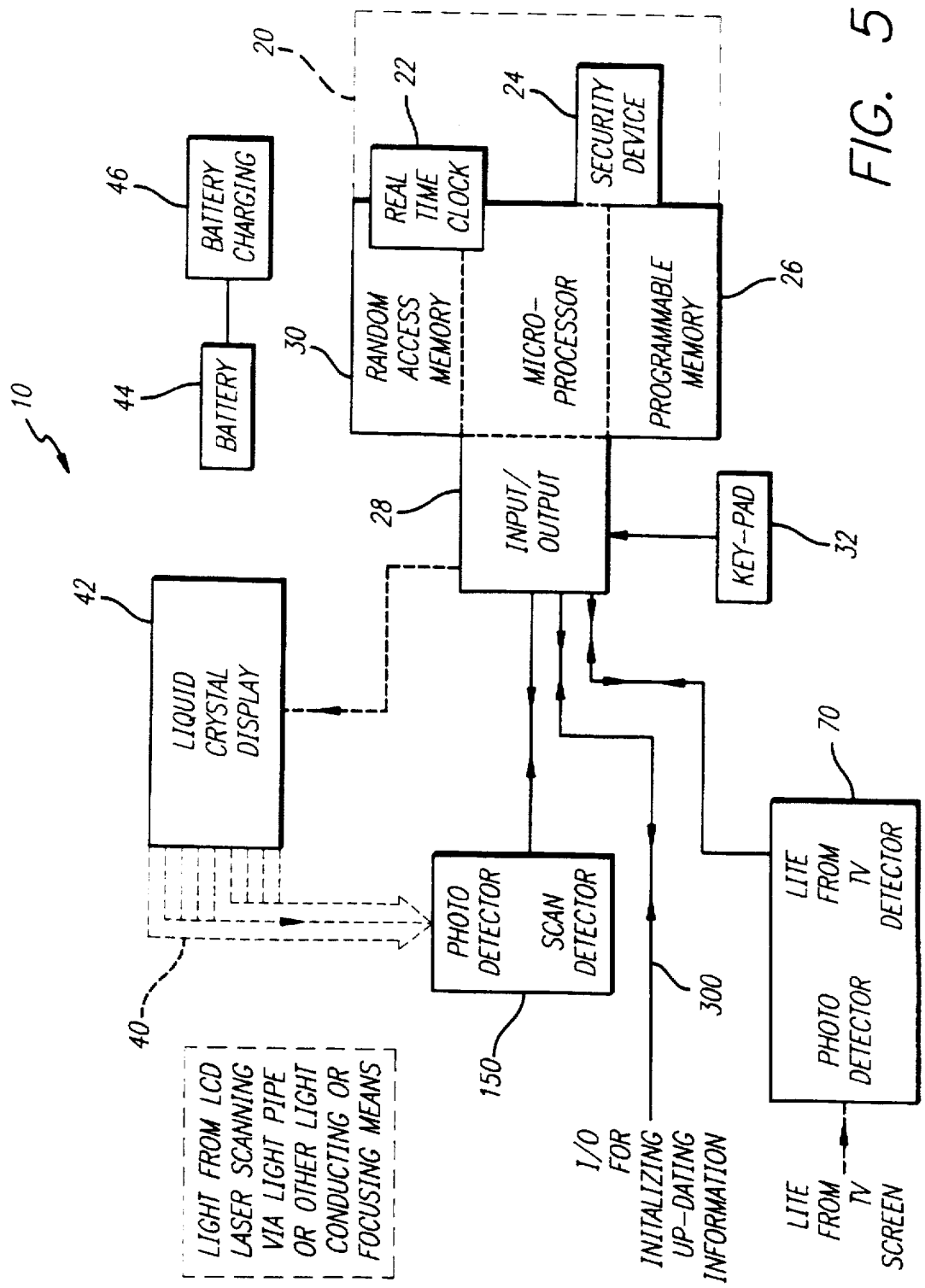
FIG. 5 is a schematic view of the scan detection circuit of the present TV card.

FIG. 5 shows that the present TV Card 10 may consist of the following described blocks. A card micro-processor block 20 may be provided containing, a real time clock 22 to be used as information for security purposes and as fraud detection and a security device 24 containing encryption keys and algorithms. System firmware 26 may be contained within programmable read only memory or mask programmable memory. The firmware is the operating system which supervises the system's operation. The input/output portion 28 provides communications between the microprocessor and the other parts of the system. Random access memory 30 is the scratch pad memory for system operation as well as the system data retention means. The Liquid Crystal Display (LCD) 42 displays human readable characters and machine readable characters among which are optical character recognition (OCR), fonts, and bar codes. The light pipe 40 serves to conduct external "scanning light" to photo pick-up 150. Photo and scan detector 150 inputs information to the micro-processor. The External Input/Output (I/O) 300 passes data via input-output portion 28 to the processor 20. Light and data from the TV screen is detected by photo and data detector 70 and sent to the micro-processor.

The card may have a keypad 32 which allows human interface to the card. Portion 44 is the battery, which may be optionally charged by circuit 46 which may be powered by some mechanism such as storage battery or AC line power supply.

The TV Card

Figure 6:
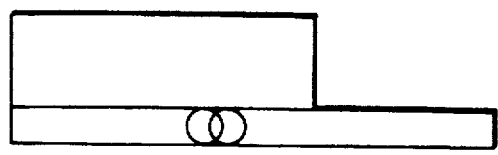
FIG. 6 is a block diagram of the circuit reading the light from the television set.

The TV Card's physical construction desirably meets several diverse and opposing requirements. The card desirably is an thin as possible for convenience, yet thick enough to protect the LCD and integrated circuit from flexing. The card should be thin enough to fit into a "swipe type magnetic card reader" and yet be big enough to house enough battery power to have a reasonable life span. To accomplish these goals a non uniform cross section of two or more thicknesses may be used (FIG. 6—side view). The lower portion of the card may be as thin as a normal magnetic credit or identification card, while the portion which protrudes from the "swipe type magnetic card reader" is thicker to house the battery 44, LCD 42 and IC 10 as well as the largest optics possible.

One of many commercially available Smart Card type micro-processor chips is a Phillips Semiconductor model 83C852. It requires only six external connections yet incorporates a full 8051 type microprocessor, security, memory both read only (ROM), read, write (RAM) and electrically erasable programmable (EEPROM) types. The EEPROM can be written and erases 10,000 times, read and infinite number of times and retains data for ten years even without power. The functions incorporated within the 83C852 are: microprocessor 20 containing Random access memory 30, security device 24, programmable memory 26, part of the input/output 28 and timers which could be utilized to simulate the real time clock 22. Other LCD controllers may be integral with the LCD or be external, Processor such as NEC 7502, 7503, 7530x and others have built in alphanumeric LCD display as stand alone chips such as NEC 7225, 7227 and 7228. These are meant to be merely examples of the many commercially available LCD drivers.

Dallas Semiconductor, among many others, illustrates integrated circuits with the following block diagram functions: DS1202 Real time clock (22), DS1243 Clock (22) and memory (30), DS5002FP and DS1220Y Secure and non-volatile memory (30), DS1203S-B1, DS1282, DS199x, DS2267, DS606xA, DS6068AK, DS6460, DS9092, DS9093 devices are identification and communications IC's for near proximity and contact transmission of data. Any of these and other methods can be examples of data transmission and reception between the card and external devices and accessories. Common Universal Asynchronous Receiver Transmitters (UARTs) for data are common in the 8051 micro-processor family. "Glue logic" to tie all the parts together are available discreetly or as part of Programmable Gate Array Logic (PAL or GAL) a few typical applications are found in the ALTERA Corporation Applications Book Pages 103, Custom UARTS, 109 Manchester coders and 116 Basic building Block design for Microprocessor interfacing LDC Display.

The LCD display can be implemented in a number of ways which are apparent to those skilled in the art. LCD's fall into two broad categories, graphics displays and formed character displays. A graphics display is made up of individual dots or picture elements (pixels) which can be switched on or off to create human readable pictures or characters. Formed characters are complete words or characters that are turned on or off as discrete units or blocks.
Fully Formed Characters Many times a display is designed for a specific purpose. A display for a microwave oven might have words like time and power which appear as discrete words. As well as an area with two numerals separated from the next two numerals by a colon to display time of day and cooking time. Such a display would not be able to display pictures or all of the alphabetic characters in a pleasing, easily readable font.
Graphics Displays An LCD television display is an example of a pure graphics display as not only can each pixel be individually be commanded on and off (black and white) but also part way on and off to make a gray scale. The market place also has seen a number of scientific pocket calculators with graphics displays. The calculators can display multiple lines of numbers and text as well as complex mathematical symbols and formulas. The results of the calculations may then be displayed graphically as charts or line, bar or curved plots of the functions.

The card in the present invention can utilize any of a number of display methods among which include the following:

1. An all graphics display so that essentially anything from a picture to a character can be effectively displayed anywhere on the screen or,
2. A mix certain functions like TV message received or battery low could be dedicated preformed blocks, or
3. The bar code area could be pre-formed lines which are turned on and of to make ones and zeros in the bar code or, 4. An area of alpha-numeric characters with multisegments pre-formed and used in combination to spell words and display numbers. This mix of functions is preferred to provide the most utility and ease of use at the lowest cost.

Operation of the Present Invention

During the manufacturing process I/O line 300 (FIG. 4) is used to initialize and set up the processor memory and personalize each card. Personalization includes serialization and presetting customer specific data including Personal Identification Numbers (PIN). Normal housekeeping chores are accomplished by micro-processor 20. These include communications with the various sub-systems 42 and 32, clocking and time keeping 22, memory storage 30, and data 70 and scan detection 150.

While the TV Cardholder is watching television, the TV Card logo or icon is periodically displayed on the screen indicating that card-readable data is available. The consumer then presses the "TV" activate button 82 on the keypad 32 and holds the card, with a photoelectric television signal optical pickup device imbedded in it, facing and near the TV screen. Confirmation of good data reception is delineated to the TV Cardholder via characters displayed on LCD 42. The process described above uses photo and data detector 70 to decode light from the TV screen containing benefit or value data such as: money, discounts, value, redemption limits relating to individual stores or expiration dates, Universal Product Codes (UPC) and human readable index words.

Figure 7:
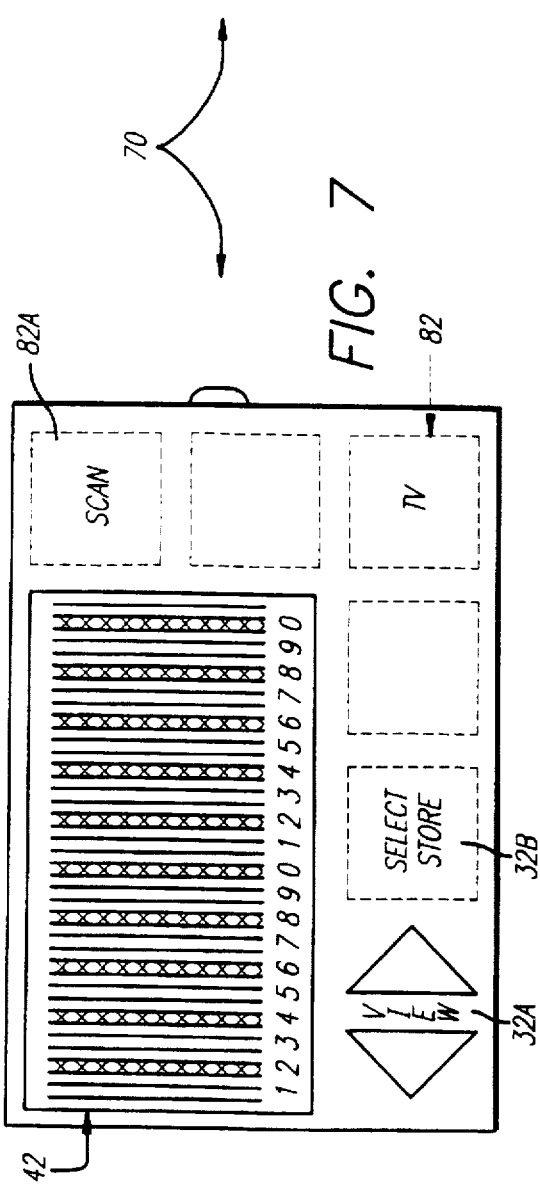
FIG. 7 shows a block diagram of the circuit reading the light from the television set.
Figure 8:
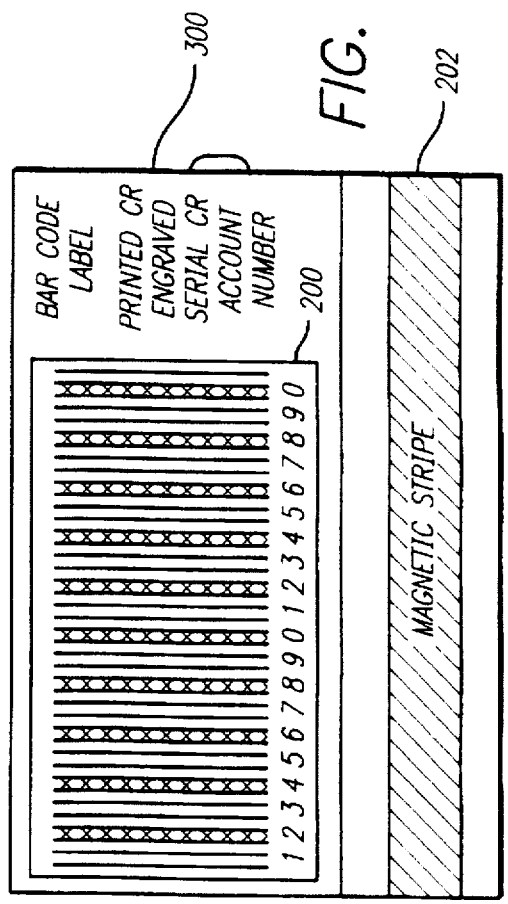
FIG. 8 illustrates an auxiliary piece of equipment for handling longer range use of the TV card.

After capturing benefits or values from the television broadcast, the card holder may go the store to take advantage of the benefits or values, or redeem the card coupons. For example (FIGS. 6 through 8), the customer may want to purchase several items at their local supermarket, department store or music store. By using the left-right view arrows 32A, the customer selects one item which is labeled available at the supermarket, department store or music store. Next, pressing the select store key 32B_, causes only those items labeled supermarket, department store or music store to be displayed. Pressing the left-right view arrows 32A, now rotates through a sub-set of the benefits or values available, simplifying the consumers shopping chore. After the times have been selected and brought to the check-out counter, they are scanned normally by the point of sale scanner. Near the end of the sale, the customer presses the scan button on the keypad 82A, and the bar codes are now displayed. As the card is waved over the scanner each individual bar code is read. This procedure is followed for each benefit or value to be redeemed. After a check to see that the proper items have been purchased, credit for the values is given to the customer automatically via the point of sale terminal.

The system also compensates for problems which would otherwise annoy the customer. For example, an advertiser may specify that a given benefit or value might be used only once or it may have a very short redemption period. The expiration date might be as short as a few hours. The customer might be very upset if upon going to the store they found that the store scanner would not scan the card properly or that the item codes were incorrectly entered into the store computer. The coupon would be erased a few minutes after the scan is detected, however, during that time the information would be displayed in human readable characters. The present invention will accept manual entry of the data, serial number and a code word to correct a faulty point of purchase scan. The card holder would be instructed to immediately write down the data and then have the sales clerk manually enter the data. If the manual entry fails, the clerk would be instructed to call a toll free number for authorization. This procedure is very similar to the current procedures for credit card verification.

Like credit card verification, special authorization may be required if the amount of the benefit or value is above a set floor value, the business doesn't have a scanner (automobile dealers might not use a scanner for auto sales) or the scanner is malfunctioning. An alternative might be to require that a large discount might be charged to the account of the smart card. The normal credit verification could then be used to control fraudulent use.

In many instances the advertiser does not care how frequently the benefit or value is redeemed as long as each time the redeemable product, tied to the benefit or value, was actually purchased. The fact that the TV Card's serial number or account number is tied to each sale, minimizes fraud because misuse can be traced back to the card.

Alternate Embodiments Long Range Optics and Battery Holder

Figure 9:
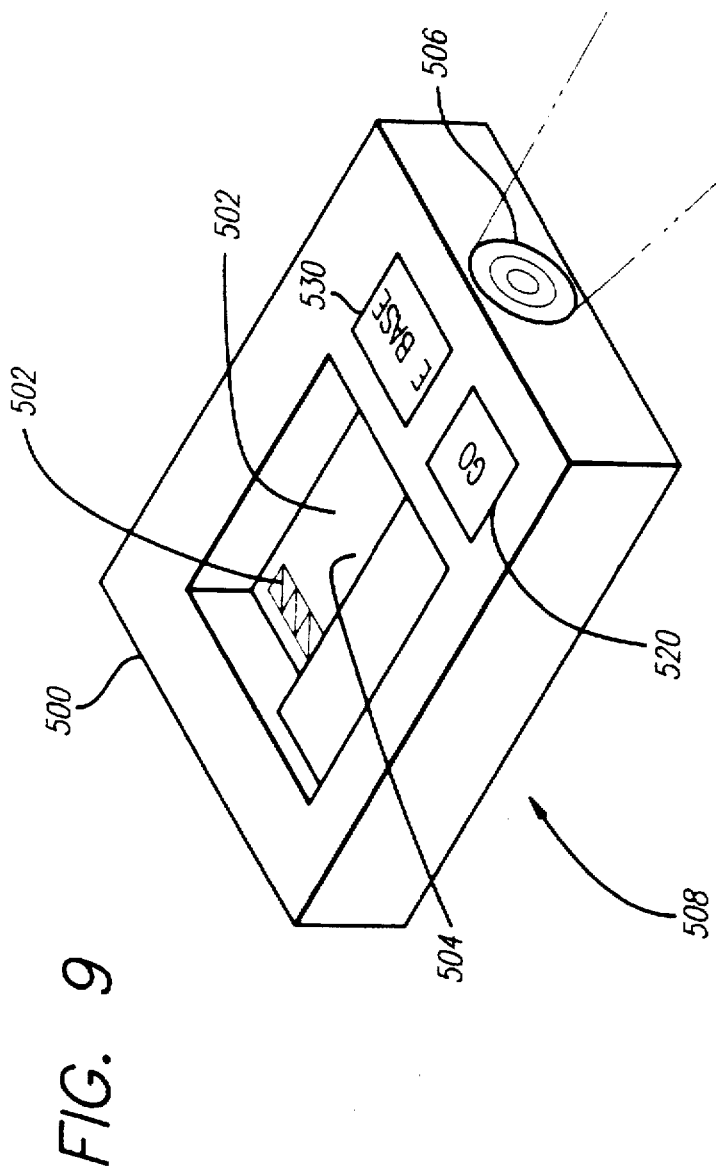
FIG. 9 shows an alternate long range piece of equipment for reading the light signals from the television set.

To make the use of the card easier it is desirable to receive data from the light of the TV set from the customer's easy chair. The size of the card limits the size of the optics utilized to relay the light to the optical pick-up, requiring that the card be held close to the TV set to receive data. The addition of methods to extend the pick-up range are desirable. A holder 500 (FIG. 9) which has a recess 504 in which the card is placed allows several desirable benefits: a larger battery 508 source for power, room for larger light gathering optics 506, additional larger operational buttons or controls to activate 520 and erase 530 message inputs to the TV Card, connector 502 to transfer information to and from the card, and an indicator light which is activated briefly whenever an announcement of programming containing TV Card data is transmitted.

The ordinary optics can be categorized two ways; one is a coherent image the other is non-imaging. The difference can be illustrated as the difference between clear window glass which transmits a coherent image and bumpy or frosted glass which transmits light and a hazy image. The lens required in this product is yet a third type. The optics are required in this product is yet a third type. The optics are required to transmit a time multiplexed data signal. The signal from the TV set has a unique signature. Only the time domain must be preserved. The fact that an image is produced or the light is defuse is not important to the operation of the optical pick-up. This fact is exploited by actually producing a multitude of images simultaneously on one single optical pick-up. This allows the detector to effectively look many different directions at the same time. The light signature is a code extending along the time domain. An exactly predictable and detectable sequence is to be recognized. The speed of light is utilized to separate the data packets. Because the data is extremely slow when compared with the speed of light, data dispersion and any delayed light caused by reflections or any other natural causes have a great deal of time to decay and hence the previous light pulse does not contaminate the present light pulse.

Near TV Holder and Remote Control

An alternative method to make use and data pick-up from the TV set is to employ a holder 600 (FIG. 10) at a stationary position near the TV set. This allows the card's optics to detect the TV light directly or via a relay lens, while a calculator style power module 608 supplies power from the house AC power line. Alternatively an additional optical or magnetic transmission and reception devices 604 could be built within the holder to transfer data directly to the card via 604 connector. An IR remote control 610 and IR sensor 606 is also provided for the customer to choose the specific offers that they would like to record within the card. The holder 600 has a space for additional controls, buttons, lights as desired. There is also an indicator light which is activated briefly whenever an announcement of programming containing TV Card data is transmitted.

Simple Holder or Stand

A purely mechanical stand or holder may position TV Card 300 for a good view of the TV set. The customer could press the "activate" button 82 on the TV Card 300 and place the card upon the stand; or if the card was already in the stand, merely press the "activate" button. One object of this invention is to assure the advertiser that a person is watching the programming containing the TV Card data. Therefore the TV Card is designed so that he button must be pressed to respond to each offer. Also, to converse power it is not desirable to leave the TV watching optical pick-up active for long periods of time. The button to "activate" is desirably pushed and released alternately to operate, thus preventing the continuous activation of the TV Card.

Active Relay Station At The Television or Other Transmission Receiving Venues

U.S. Pat. No. 4,807,031 teaches the use of an active relay station at the TV set. The TV light is picked-up near the TV set and re-transmitted via light, visible or IR, radio or other means. The retransmitted light has a higher power level compared to the TV light. Therefore the data is more easily received by the TV Card at a greater distance from the TV set than otherwise possible; i.e. the TV Card with relatively small optics can receive data without added receiving optics at greater distances and in the presence of interfering light sources.

An infra-red transmission method may also be used on Projection televisions, Active Matrix displays, LCD type TV sets and other low light level televisions.

The TV Card may be used in a movie theater. Within the theater would be installed in an infra-red (IR) diode transmission array. At the appropriate tine in the program, a digital signal would be sent that is the equivalent of the scanned TV data signal. The data would be triggered by the movie or other programming.

Encoding

The data, which will be subsequently read from the changing light impulses on the television screen, is added to the video signal prior to transmission in a process called encoding. The programming material that is to contain the data intended for the TV Card may be encoded at the tele-production house and distributed via normal network, tape or satellite methods. This requires no new equipment at the broadcast or cable facility. As demand increases and a station wishes to encode local news, sports or commercials, an encoder driven by a common personal computer and application software would be the only additional equipment needed.

Card Read-out on Television screens and Printing

The TV Card has the approximate dimensions of a conventional credit card except that it is somewhat thicker. And as accessory for the TV Card, a unit in the home could accept the card and display the contents on the home TV screen. The technology is in common use for on screen programing of VCR's and television sets. An extra slot to accept the card in a VCR or TV, would merely substitute the card contents as the on-screen graphics source instead of the normal menu. The majority of the necessary circuits such an the control micro-processor synchronizing and character generation and video circuits already exist within VCR and television designs. The processor would simply read the TV Card's memory to the TV screen through the VCR's or television's character generator circuits. Buttons or controls on the card, VCR, TV or a remote control could be used to scroll through and even delete unwanted entries. The TV display functions among which are Phillips 8XCO53, 54 and 55 as described in the Computer Applications Journal October/November 1992 Page 40 "Add text overlay to any video display."

Existing personal computers and printer, in some situations, could be utilized with the appropriate hardware and software interfaces to print coupons or appropriate documents identifying TV Card benefits and values.

A TV monitor display with touch screen, soft keys or other controls televises all TV Card benefits and values, allowing for only the desired item, shopping list or coupons to be printed. The customer thus can save paper or print items at their convenience.

Computer Game, CD-ROM & Multimedia Uses

The TV Card System is fully usable for transferring data via any scanned television like system. The TV Card can receive data from computer screens connected to various data base systems. Software discs, Video Game Cartridges and CD-ROM devices can also have their programming encoded to add benefits via the TV Card.

Pre-Recorded Video Tape, Movie Previews, and Trailers

Programming including advertisements have been added prior to the beginning or after the end of rental videos and videos for sale. Both the pre and post programming or advertisement and the movie itself could be encoded with the intent of transferring data and benefit and value via the TV Card.

Entry to Specific Program Identified Venues or Events

The TV Card may be used in a variety of ways to provide unique interactive benefits and values. For example, a TV Card holder may be watching a TV program in a hotel room or other location and be alerted to an offer or value for a local tourist attraction or place of interest. By holding the TV Card near the television, the TV Card may receive and store a specific value to be redeemed at that attraction or place of interest.

The TV Card may also be used as a ticket for admission to an event. A cardholder could telephone a ticket service which is broadcasting on its own TV channel or cable TV channel. While the TV Card is held near the television, the ticket service may authorize only that specific single card for entry to this event. Other cards could also be authorized sequentially.

TV Card/Scanner Activated Software

Existing point of purchase laser scanner terminals and appropriate software are capable of recognizing various forms of universal product codes (UPC's). The present invention adds an application software code to existing UPC tables to expand the capabilities of the system. The added software allows for the reading and capture of specific TV Cardholder account numbers and other information necessary to provide demographic, psychographic, and other individual or family data. The software system can then correlate the items purchased with the cardholder's identity so that the exact demographics can be offered.

TV Card Activated Price Look-Up Code Software

The present invention's TV Card's bar code display is read by a scanning device, at the point of purchase or benefit venue redemption location, that is connected to a retailer's or seller's computer center. The software has been input with information regarding benefit or value on products, time frames and other pertinent attributes specifically intended to add televised programming. The present invention's software stores inputs generated by and associated with specific TV Card televised programming.

What is claimed is:

1. A television signal activated interactive smart card system featuring the transmission of data information along with a standard television or computer video signal for reception by a smart card imbedded with a photoelectric television signal optical pick-up device, and a human and light scan readable display at a benefit redemption venue in conjunction with television broadcasts, in home television reception and point of purchase locations, a method for offering point of purchase benefits and values, said method comprising;

transmission of television or computer video signal comprising a programmed message including audio and video portions;

encoding a data signal that identifies and offers value and/or benefit on products and/or services; receiving said data signal on said smart card using said photoelectric television signal optical pick-up device;

storing said data signal on said smart card;

transporting said smart card to a point of purchase location;

reading said stored data for purposes of receiving value or benefits by purchasing said products or services; and erasing said stored product or service identification and value or benefit.

2. The method of claim 1 wherein said recording of said product identification and value/benefits comprise recording on a smart card.

3. The method of claim 2 wherein said smart card records sequences of light pulses.

4. The method of claim 2 wherein said method of recording includes interconnecting said smart card with an in-home television receiver.

5. The method of claim 2 wherein said reading of said smart card includes reading of a plurality of sets of product identification and value/benefit data items that are for use in product purchasing.

6. The method of claim 5 wherein said selective recovering includes selective removing of outdated value/benefits.

7. The method of claim 2 wherein said broadcast signal includes a visually observable indicator that the programming carries a non visual signal of product identification and value/benefit information.

8. The method of claim 2 wherein said product identification and value/benefit signal comprises a bar code and/or light scan readable method.

9. The method of claim 8 wherein said stored data is automatically released after the expiration of a specific time period.

10. The method of claim 9 wherein said specific time period is carried by said authorization signal and imputed into said smart card along with said product identification and value/benefit data.

11. The method of claim 1 wherein said television advertising is recorded on a video recording for reading when said video is played on a television set.

12. The method of claim 11 wherein said television programming is recorded on said video recording at the time of rental or sale of said video.

13. The method of claim 8 wherein the scanning of said bar code recording erases said recording.

14. The method of claim 2 including the step of reading the stored data recorded on the smart card in the home prior to transporting said smart card to the point of purchase and/or benefit redemption venue.

15. The method of claim 2 wherein the use of said recording is recorded and compiled with the use of various other similar smart cards to measure the impact of the encoded televised programming.

16. The method of claim 2 wherein said smart card incorporates the attributes of a conventional credit card and wherein said method includes the step of recording the credit purchase of the televised product or service.

17. The method of claim 1 wherein the TV Cardholder's identity is read from the card and the purchase of the items is via a Credit Card transaction.

18. The method of claim 1 wherein the TV Cardholder's identity is read from the card and the purchase the items is recorded via an Identity Card transaction upon entering the proper personal identification number.

19. The method of claim 1 wherein the TV Cardholder's identity is read from the card and the purchase the items is recorded via a Debit Card transaction upon entering of a proper personal identification number.

20. The method of claim 1 wherein the TV Cardholder's identity is read from the card and the purchase records the purchased items via an Affinity Card transaction.

21. The method of claim 1 including the step of checking the card for possible fraud.

22. The method of claim 1 including displaying a confirmation to the TV Cardholder that good data was recorded.

23. The method of claim 1 wherein the recorded data is segregated into indexed groups.

24. The method of claim 1 wherein the scanning of the TV Card by a retail point of sale is detected by the card to initiate the erasure procedure.

25. The method of claim 23 wherein the bar code display is incremented to the next item's code following each scan.

26. The method of claim 23 wherein the light from the LCD is concentrated and applied to a light detecting means.

27. The method of claim 23 wherein the scan light is conditionally accepted as a valid scan by amplitude, modulation and timing criteria.

28. The method of claim 3 wherein the TV Cardholder's identity is read from the card and the cardholder is able to purchase the items via an Identity Card transaction if the proper optional personal identification number is entered.

29. The method of claim 2 wherein the TV Cardholder's identity is read from the card and the purchase of the items is recorded via a Debit Card transaction.

30. The method of claim 2 wherein the TV Cardholder's identity is read from the card and the purchase the items is recorded via an Affinity Card transaction.

31. The method of claim 2 including the step of review for fraud detection and prevention, encrypting means, and coupon misuse.

32. The method of claim 2 including the step of confirming visually that good data was received and recorded on the card.

33. The method of claim 2 wherein the data is segregated into groups with an index word or phrase to allow a group of items to be selected.

34. The method of claim 1 wherein the benefit offered on large value items and point of purchase venues which do not have point of sale terminals, the TV Card can be visually read.

35. The method of claim 2 including the step of transferring data from the advertiser to the point of sale terminal so as to pre-dispose the point of sale terminal to accept the data without requiring manual entry of data at each point of sale terminal.

36. The method of claim 15 wherein the identity of the TV Cardholder is recorded and compiled to measure the advertising impact.

37. The method of claim 1 wherein the scan light is conditionally accepted as a valid scan by amplitude, modulation, and timing criteria.

38. The method of claim 2 wherein the scanning of the TV Card by a retail point of sale is detected to initiate the erasure procedure.

39. The method of claim 38 wherein the bar code display is incremented to the next item's code following each scan.

40. The method of claim 39 wherein the light from the LCD is concentrated and applied to a light detecting means.

41. The method of claim 40 wherein the scan light is conditionally accepted as a valid scan by amplitude, modulation and timing criteria.

42. The method of claim 3 wherein the benefit offered on large value items and point of purchase venues which do not have point of sale terminals, the TV Card can be read by a human to obtain authority via telephone confirmation.

43. The method of claim 42 wherein the telephone authorization method includes pressing buttons on the TV Card in a specific order, each of which displays a security/fraud prevention number to be read over the phone verifying a valid transaction.

44. The method of claim 2 where the identity of the TV Cardholder is recorded and compiled to measure the advertising impact.

45. The method of claim 2 where the scan light is conditionally accepted as a valid scan by amplitude, modulation and timing criteria.

46. The method of claim 16 wherein the identity of the TV Cardholder is recorded and compiled to measure the advertising impact.

47. The method of claim 16 wherein the scan light is conditionally accepted as a valid scan by amplitude, modulation, and timing criteria.

48. The method of claim 16 that includes fraud detection and prevention, encrypting means, and coupon misuses.

49. The method of claim 16 that includes confirmation to the TV Cardholder that good data was received via a human readable means.

50. The method of claim 16 wherein the data is segregated into groups with an index word or phrase to allow a group of items to be selected.

51. The method of claim 16 wherein a fall-back method is utilized to input data to the point of sale terminal in the event that the bar code and/or light scan reader fails for any reason.

52. The method of claim 16 wherein the scanning of the TV Card by a retail point of sale is detected to initiate the erasure procedure.

53. The method of claim 16 wherein the bar code display is incremented to the next item's code following each scan.

54. The method of claim 16 wherein the light from the LCD is concentrated and applied to a light detecting means.

55. The method of claim 16 wherein the scan light is conditionally accepted as a valid scan by amplitude, modulation and timing criteria.

56. The method of claim 17 wherein the benefit offered on large value items and point of purchase venues which do not have point of sale terminals, the TV Card can be read by a human to obtain authority via telephone confirmation.

57. The method of claim 56 wherein the telephone authorization method includes pressing buttons on the TV Card in a specific order, each of which displays a security/fraud prevention number to be read over the phone verifying a valid transaction.

58. The method of claim 17 where the identity of the TV Cardholder is recorded and compiled to measure the advertising impact.

59. The method of claim 17 where the scan light is conditionally accepted as a valid scan by amplitude, modulation and timing criteria.

60. The method of claim 17 where the TV Cardholder's identity read from the card and the cardholder is able to purchase the items via a Credit Card transaction if the proper personal identification number is entered.

61. The method of claim 17 wherein the TV Cardholder's identity is read from the card and the cardholder is able to purchase the items via an Identity Card transaction if the proper optional personal identification number is entered.

62. The method of claim 17 wherein the TV Cardholder's identity is read from the card and the cardholder is able to purchase the items via a Debit Card transaction if the proper optional personal identification number is entered.

63. The method of claim 17 wherein the TV Cardholder's identity is read from the card and the cardholder is able to purchase the items via a Affinity Card transaction if the proper optional personal identification number is entered.

64. The method of claim 17 including fraud detection and prevention, encrypting means, and coupon misuse.

65. The method of claim 17 including confirmation that good data was received via a human readable means.

66. The method of claim 17 wherein the data is segregated into groups with an index word or phrase to allow a group of items to be selected.

67. The method of claim 66 wherein the bar code display is incremented to the next item's code following each scan.

68. The method of claim 67 wherein the light from the LCD is concentrated and applied to a light detecting means.

69. The method of claim 68 wherein the scan light is conditionally accepted as a valid scan by amplitude, modulation and timing criteria.

70. The method of claim 68 in which the customer identity is correlated with a data base containing other information such as a history of prior transactions to produce reports useful to future marketing and advertising.

71. The method of claim 70 in which the customer's identity and purchased items are down loaded to a collection point.

72. The method of claim 71 wherein the data is correlated and distributed to advertising to be used to verify information and demographics.

73. The method of claim 35 wherein the program material is encoded with the video light code and essentially simultaneously the data is down loaded to the point of sale terminal to predispose it to recognize that given transaction.

74. The method of claim 73 wherein the authorizing and authenticating data is down loaded to protect the transaction integrity.

75. The method of claim 73 wherein the means of down loading includes human interaction in the event of mechanical failure.

76. The method of claim 42 wherein the visual reading provides information for access to telephone authorization and verification, said method including pressing buttons on the TV Card in a specific order, each of which displays a security/fraud prevention number to be read over the telephone verifying the validity of the transaction.

* * * * *